UNITED STATES PATENT OFFICE.

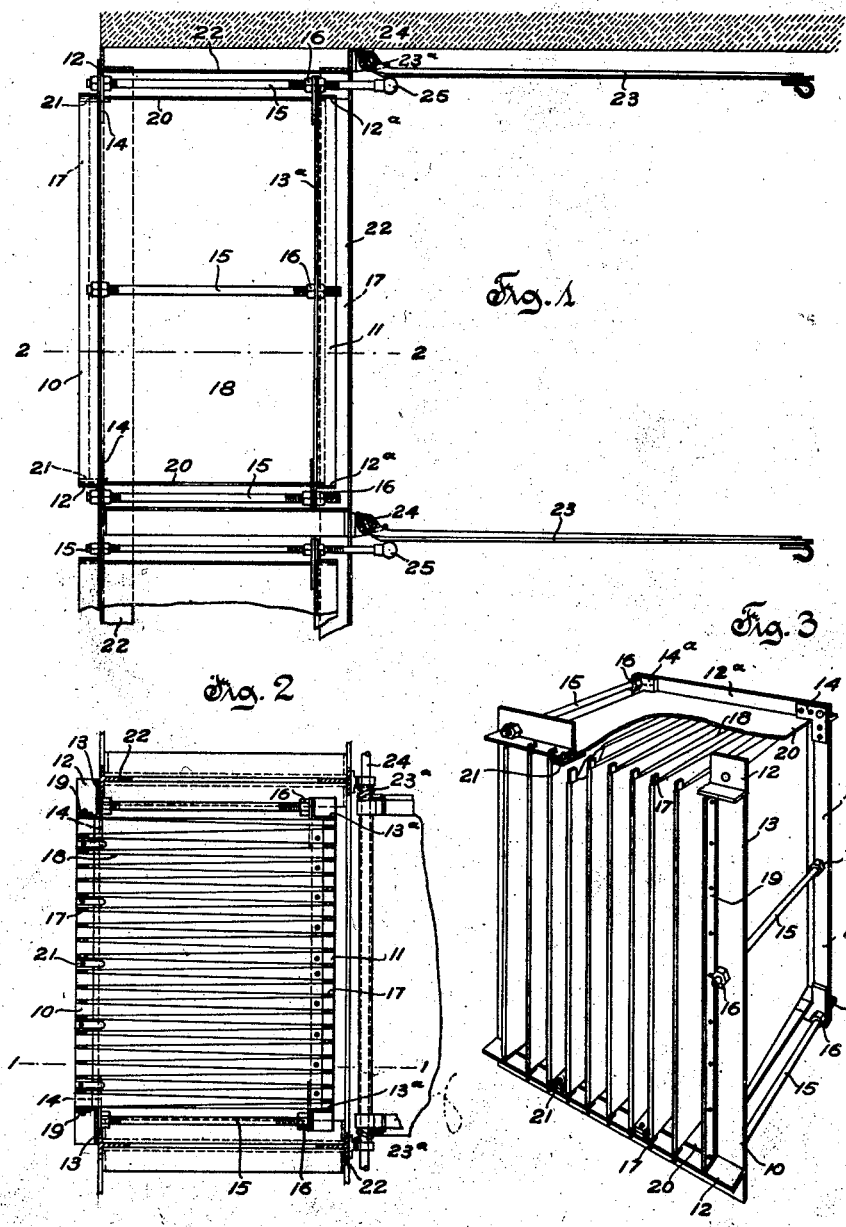

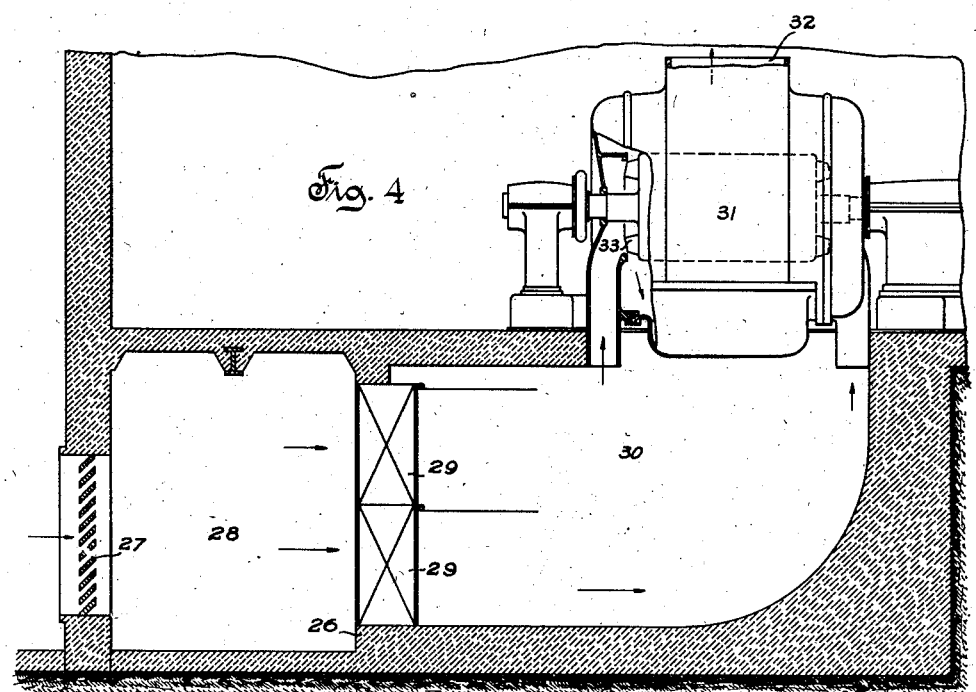
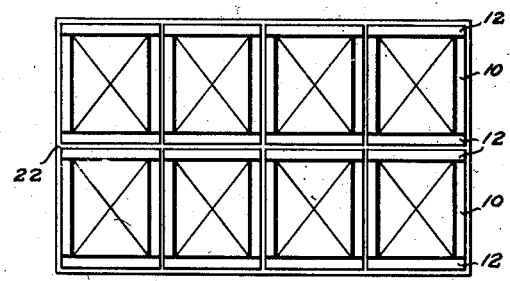

ROBERT B. WILLIAMSON, OF MILWAUKEE, WISCONSIN, ASSIGNOR TO ALLIS-CHALMERS COMPANY, A CORPORATION OF NEW JERSEY.

FILTER.

1,049,789. Specification of Letters Patent. Patented Jan. 7, 1913.

Application filed May 29, 1911. Serial No. 630,019.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Filters, of which the following is a full, clear, and exact specification.

My invention relates to air filters, particularly as used in connection with dynamo-electric machines.

In the operation of the modern turbo-generator, immense quantities of air are forced through the machine in order to maintain it at a sufficiently low temperature. This air should be purified, in order to prevent it from carrying into the machine undesirable solid matter, which might produce disastrous results, such as short-circuits or grounds.

It is the object of my invention to obtain this purification of the air.

To this end, I have provided an air filter which removes all solid matter from the air supplied to the machine and yet offers but slight obstruction to the flow of the air. The filter consists of a sheet of some suitable fabric, mounted zig-zag in a suitable frame. The frame forms a support for, and is adjustable to give the desired tension to, the fabric. It includes suitable plates adjacent to the edges of the fabric to prevent the air from passing around such edges instead of through the fabric. Each frame, with the fabric supported thereby, forms a unit; the units are preferably interchangeable, and may be built up, in a suitable supporting frame, to form filters comprising any desired number and arrangement of the units, much like panes of glass in a window. Each unit is preferably separately removable, thus facilitating inspection and repair. In plants using my air filter, one or more spare units are generally kept on hand, so that when one unit is removed another may immediately be substituted for it. Moreover, for each unit the supporting frame is preferably provided with an automatic door, which, when its associated unit is removed, automatically closes the space occupied by such unit, thus preventing the admission of unfiltered air to the machine.

While my invention is particularly designed and adapted for use in connection with dynamo-electric machines, it may also be used in other connections.

The various novel features of my invention will appear from the description and drawings, and will be particularly pointed out in the claims.

Figure 1 is a partial vertical section, substantially on the line 1—1 of Fig. 2, through an air filter embodying my invention; Fig. 2 is a partial section on the line 2—2 of Fig. 1; Fig. 3 is a perspective view of one of the units, some of the parts being broken away in order better to show the construction. Fig. 4 shows a dynamo-electric machine receiving air through one of my air filters; and, Fig. 5 is an elevation of one of the air filters, showing how the units are built up.

Each unit of my improved air filter preferably comprises front and rear portions, denoted in their entirety as 10 and 11 respectively. The front portion 10 comprises two horizontally extending angle irons 12, the ends of which are joined by vertically extending angle irons 13, the angle irons 12 and 13 being fastened together by angle pieces 14. The rear portion 11 comprises similar parts $12^a$, $13^a$, and $14^a$. The inner dimensions of these rectangular frame portions are the same, while for reasons hereinafter apparent the outer dimensions of the front portion are somewhat larger than those of the rear one. The frame portions 10 and 11 are connected by threaded rods 15, nuts 16 on which furnish a convenient means for adjusting the distance between said portions. The horizontal flanges of the angle irons 12 and $12^a$ are notched for the reception of vertical rods 17, the rods in the front and rear frame portions preferably being staggered. A strip 18 of some suitable fabric, such as cheese-cloth, is wound back and forth over the rods 17 in the front and rear frame portions, forming a zig-zag fabric screen as best shown in Figs. 2 and 3. The distance between the horizontal flanges of the upper and lower angle irons 12 or $12^a$ is preferably just slightly greater than some standard width of fabric; in the preferred form of arrangement these horizontal flanges are spaced apart substantially a quarter of an inch over a yard. The ends of the fabric strip 18 are fastened in any suitable manner, preferably by being bent over the edges of the forwardly extending flanges of the angle irons 13 and clamped to such flanges by metal strips 19. The tension of the fabric strip is adjustable by varying the distance between the front and rear frame portions, by means of the nuts 16 on the rods 15. Sheet iron plates 20 abut against the upper and lower edges of the strip 18, being fastened to the rear angle irons 12ª and resting between the front angle irons 12 and suitable fingers 21 supported on said angle irons 12; this method of support does not interfere with the adjustment of the distance between the front and rear frame portions. The plates 20 prevent the air, which enters at the front of the unit and leaves at the back, from passing around the edges of the fabric strip 18.

The units may be used separately, but are generally used in groups, one group arrangement being shown in Fig. 5. When used in groups, or even when used singly, they are preferably removably mounted in a suitable supporting frame 22, preferably of iron. This supporting frame is made up in any desired manner so that it has vertical and horizontal portions, forming, as it were, a number of pigeon-holes. The size of each pigeon-hole is just sufficient to allow an easy sliding fit for the rear portion 11 of a unit frame; as a result, the larger front portion 10 of such unit frame bears against the front surface of the supporting frame 22 when the unit is in place and thus properly positions such units in the pigeon-holes. The supporting frame 22 may be mounted in a suitable opening in a wall. For each pigeon-hole of the frame there is preferably a door 23, these doors being mounted at the rear of the frame on horizontal shafts 24 supported in the frame 22 above the corresponding pigeon-holes. The doors 23 swing closed by gravity, which may be assisted by springs 23ª. In order to open the door, the rods 15 at the upper corner of each unit of the air filter project behind the unit for some distance, and have knobs 25 mounted on their ends. When the unit is put in place in its pigeon-hole, the knobs 25 strike the door 23 and open it, as indicated in Fig. 1. Upon the removal of the unit, the knobs 25 pass out of engagement with the door 23 and allow such door to swing closed.

Fig. 4 shows my air filter in connection with a turbo-generator. The air filter is mounted in a wall 26. The air passes through shutters 27 into a chamber 28, whence it passes through the air filter, denoted in its entirety by 29, into a space 30 below the end housings of the turbo-generator 31. From the chambers 30 the air passes into such end housings and through the machine 31 in any suitable manner, finally passing out of the machine, as by way of a chimney 32. Fans 33 are preferably provided on the shaft of the machine 31 to cause this movement of the air. The exhaust air from the chimney 32 may either lead to the open air, preferably at a point remote from the shutters 27, or may be used for heating and ventilating a shop or an office, furnishing, as it does, a considerable supply of heated and well filtered air.

While I have described one specific embodiment of my invention, such embodiment is merely illustrative. For instance, the filter may be used in other positions than that shown, the terms "front" and "rear" being merely convenient terms to denote the places of entrance and exit for the air. It is not necessary that either the unit frame or the supporting frame be of iron, or that the door 23 be used for closing a pigeon-hole of the supporting frame when the unit therein is removed. These features, and others, while parts of my invention, are not essential to it in all its forms, and may often be omitted or modified. In the following claims I aim to cover all modifications which may be made without departing from the spirit and scope of the invention as set forth in the claims.

What I claim as new is:

1. A filter comprising a framework forming a number of pigeon-holes, filter units removably mounted in the various pigeon-holes, and an automatically operated door for closing each pigeon-hole.

2. A filter comprising a framework forming a number of pigeon-holes, filter units removably mounted in the various pigeon-holes, and an automatically operated door for each pigeon-hole, said door tending to remain in or to be moved to closed position and being movable to open position upon the insertion of a filter unit in the pigeon-hole.

3. In combination, a frame forming a passageway, an automatically operated door for closing said passageway, and a filter unit which may be inserted in and removed from such passageway.

4. In combination, a frame forming a passageway, an automatically operated door for closing said passageway, and a filter unit which may be inserted in and removed from such passageway and when inserted in said passageway opens such door.

Milwaukee, Wis., May 26, 1911.

In testimony whereof I affix my signature, in the presence of two witnesses.

ROBERT B. WILLIAMSON.

Witnesses:
 Geo. B. Schley,
 Chas. L. Byron.